(12) United States Patent
Leppänen et al.

(10) Patent No.: US 11,818,184 B2
(45) Date of Patent: Nov. 14, 2023

(54) ENABLING COMMUNICATIONS ACTIONS IN A CONFERENCE SESSION

(71) Applicant: Nokia Technologies Oy, Espoo (FI)

(72) Inventors: Jussi Leppänen, Tampere (FI); Lasse Juhani Laaksonen, Tampere (FI); Arto Lehtiniemi, Lempäälä (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 17/537,980

(22) Filed: Nov. 30, 2021

(65) Prior Publication Data

US 2022/0191259 A1 Jun. 16, 2022

(30) Foreign Application Priority Data

Dec. 16, 2020 (EP) ...................................... 20214494

(51) Int. Cl.
*H04L 65/403* (2022.01)
*G06F 3/01* (2006.01)
*G06F 3/0346* (2013.01)
*G06F 3/0484* (2022.01)
*H04L 65/1069* (2022.01)

(52) U.S. Cl.
CPC ............ *H04L 65/403* (2013.01); *G06F 3/017* (2013.01); *G06F 3/0346* (2013.01); *G06F 3/0484* (2013.01); *H04L 65/1069* (2013.01)

(58) Field of Classification Search
CPC .................................................. H04L 65/403
See application file for complete search history.

(56) References Cited

U.S. PATENT DOCUMENTS

| | | | |
|---|---|---|---|
| 8,717,409 | B2 | 5/2014 | Khot et al. |
| 9,916,119 | B2 | 3/2018 | Jeung et al. |
| 11,474,776 | B2* | 10/2022 | Bi .................... H04R 29/001 |
| 2006/0164507 | A1* | 7/2006 | Eshkoli ................ H04N 7/152 |
| | | | 348/14.09 |
| 2009/0164219 | A1 | 6/2009 | Yeung et al. |

(Continued)

FOREIGN PATENT DOCUMENTS

KR 20160147441 A 12/2016

OTHER PUBLICATIONS

Partial European Search Report received for corresponding European Patent Application No. 20214494.5, dated May 21, 2021, 15 pages.

(Continued)

*Primary Examiner* — Olisa Anwah
(74) *Attorney, Agent, or Firm* — Joseph C. Drish; Harrington & Smith

(57) ABSTRACT

This specification describes an apparatus, method and computer program for communicating with a plurality of remote devices in a conference session, outputting, on a display, a user interface comprising a plurality of display portions respectively associated with the plurality of remote devices, and receiving user selection of one or more of the remote devices. Based on the received user selection, the apparatus may cause display of a display portion associated with the one or more selected remote devices on a linked user device which is linked to the apparatus, and enable one or more communications actions for use with the one or more selected remote devices.

20 Claims, 8 Drawing Sheets

(56) References Cited

U.S. PATENT DOCUMENTS

| | | |
|---|---|---|
| 2014/0045547 A1 | 2/2014 | Singamsetty et al. |
| 2015/0271444 A1 | 9/2015 | Defazio et al. |
| 2016/0283084 A1* | 9/2016 | Keysers .............. G06F 3/04842 |
| 2017/0150255 A1 | 5/2017 | Wang et al. |
| 2020/0178395 A1 | 6/2020 | Graber et al. |

OTHER PUBLICATIONS

Extended European Search Report received for corresponding European Patent Application No. 20214494.5, dated Sep. 8, 2021, 15 pages.

* cited by examiner

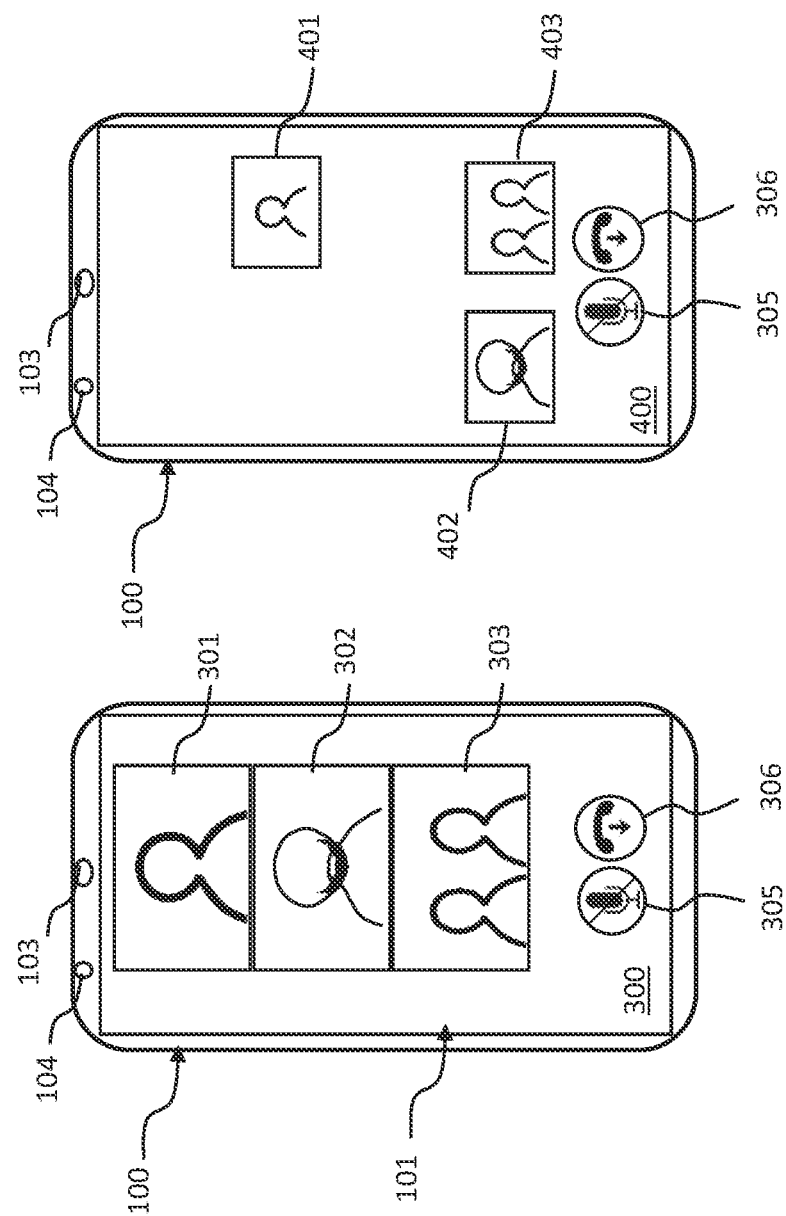

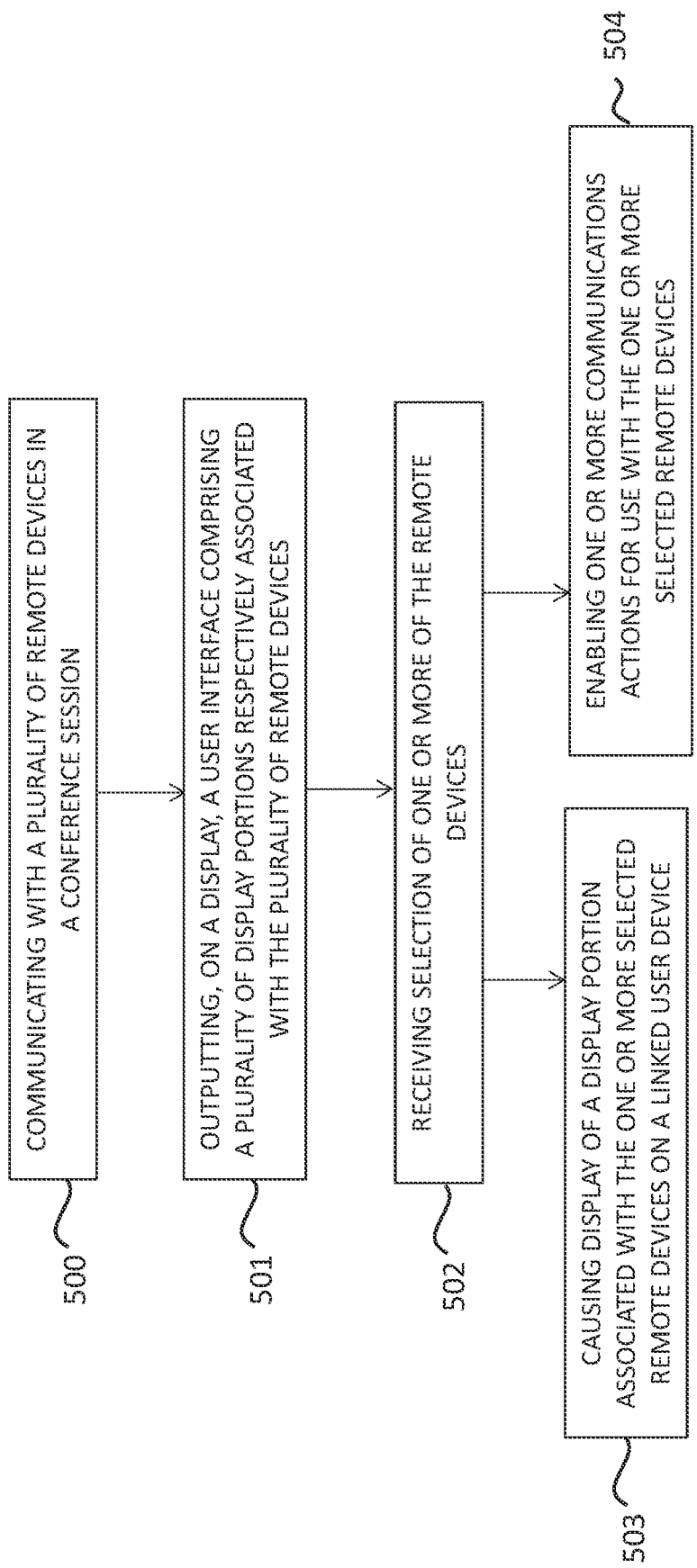

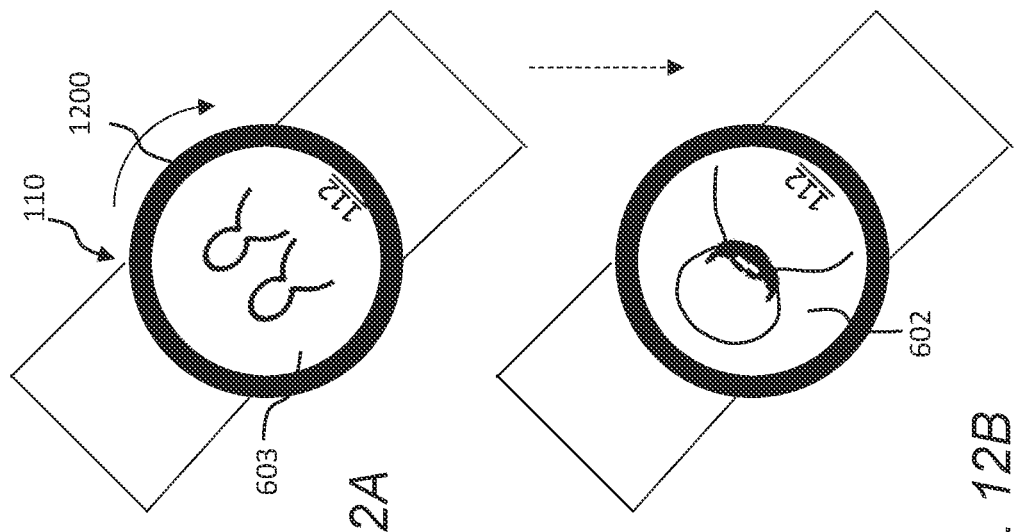
FIG. 12A
FIG. 12B
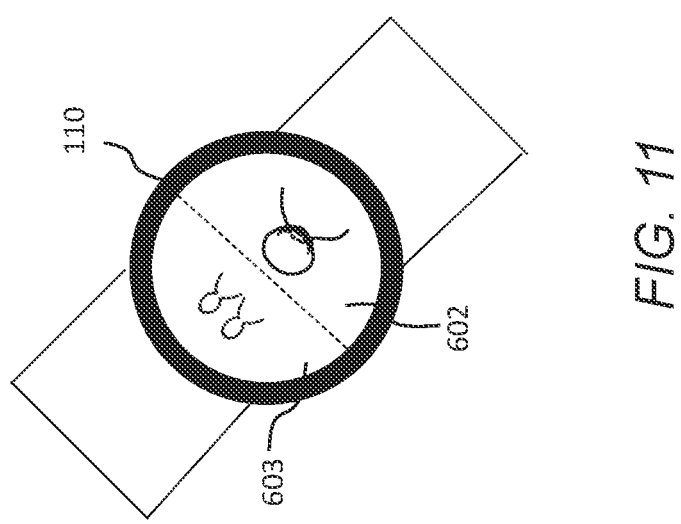
FIG. 11

ENABLING COMMUNICATIONS ACTIONS IN A CONFERENCE SESSION

FIELD

Example embodiments relate to apparatuses, methods and computer programs for enabling communications actions, for example in a conference session such as a videoconference session.

BACKGROUND

A conference session as described herein may be a communications session set-up between multiple devices, and therefore between users or parties associated with respective devices. At a time a conference session is invoked, or set-up, one or more communications channels may be established between the devices, possibly via a conference server. Thereafter, audio and/or video data may be transmitted between devices over the one or more established communications channels as part of the conference session that may be managed by the conference server. For example, in a conference session comprising first, second and third devices, audio and/or video data transmitted from the first device may be received and processed for output by each of the second and third devices in real-time or near real-time, and likewise audio and/or video data transmitted from, e.g. the linked user device, may be received and processed for output by each of the first and third devices in real-time or near-real-time.

A conference session may be an audio-only conference session or a videoconference session. In a videoconference session, video data may be captured by one or more cameras of a particular device and transmitted over the one or more established communications channels to the other devices for displaying the video data as a video feed. The video data may be accompanied by audio data captured by one or more microphones of the particular device.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for: communicating with a plurality of remote devices in a conference session; outputting, on a display, a user interface comprising a plurality of display portions respectively associated with the plurality of remote devices; receiving user selection of one or more of the remote devices; and based on the received user selection: causing display of a display portion associated with the one or more selected remote devices on a linked user device which is linked to the apparatus, and enabling one or more communications actions for use with the one or more selected remote devices.

The conference session may be a videoconference session in which the outputting means is configured to output, on the display, a user interface comprising a plurality of video feed display portions respectively associated with the plurality of remote devices, and wherein, based on the received user selection, the apparatus may be configured to cause display of a video feed display portion associated with the one or more selected remote devices on the linked user device.

The enabling means may be configured to enable audio and/or video communications actions with the selected one or more remote devices over a private communications channel which is not a part of the conference session.

The enabling means may be configured to establish the private communications channel responsive to the received user selection.

The apparatus may further comprise means for detecting a user input for initiating audio and/or video communications over the private communications channel, and, based on detecting the user input, causing capture and sending of audio and/video data over the private communications channel.

The apparatus may be configured, based on detecting a user input for initiating audio communications over the private communications channel, to cause capture of audio data by one or more microphones of the linked user device for sending over the private communications channel and to disable sending of audio data as part of the conference session.

Based on detecting the user input for initiating audio communications over the private communications channel, the apparatus may be further configured to pause or disable sending of video data from the apparatus as part of the conference session.

The apparatus may further comprise means for determining a motion of the linked user device, and wherein the detecting means may be configured to detect a user input for initiating audio communications over the private communications channel based on the determined motion of the linked user device corresponding to a predetermined gesture.

The apparatus may further comprise means for determining a position of the linked user device, and wherein the detecting means may be configured to detect a user input for initiating audio communications over the private communications channel based on the determined position of the linked user device corresponding to a predetermined position.

The detecting means may be configured to detect a user input for initiating audio communications over the private communications channel based on the determined position of the linked user device being within a predetermined distance of a user's mouth.

Based on detecting a user input for initiating video communications over the private communications channel, the apparatus may be configured to cause capture of video data by one or more cameras of the linked user device for sending over the private communications channel.

The apparatus may be further configured to cause capture of audio data by one or more microphones of the apparatus for sending over the private communications channel.

The apparatus may comprise an array of microphones, and may be configured to determine a position of the linked user device relative to the apparatus and to apply beamforming to audio data captured by the microphone array based on the determined relative position.

Responsive to receiving user selection of a plurality of remote devices, the apparatus may be configured to: cause either a simultaneous or sequential display of display portions respectively associated with the plurality of selected remote devices on the linked user device. The apparatus may be configured to cause a sequential display of display portions on the linked user device by means of, at a first time, causing display of a first display portion associated with a first one of the selected remote devices and subsequently, responsive to a user input received by the linked user device, causing display of a second display portion associated with a second one of the selected remote devices.

The apparatus may be configured to enable the one or more conference actions only for the selected remote device which has its associated display portion displayed at a current time.

The enabling means may be configured to output, on the user interface of the apparatus, one or more interactive user interface elements corresponding to one or more conference actions for the one or more selected remote devices.

Upon causing display of a display portion associated with the one or more selected remote devices on the linked user device, the apparatus may be configured to remove the display portion associated with the respective one or more selected remote devices from the user interface of the apparatus.

The apparatus may be further configured to: receive a user input for a complementary selection of remote devices; based on the received user input for a complementary selection: cause de-selection of one or more currently-selected remote devices such that their respective display portions are removed from the linked user device and the one or more enabled actions are disabled for said currently-selected remote devices; and cause selection of currently non-selected remote devices such that their respective display portions are displayed on the linked user device and one or more actions are enabled for said currently non-selected remote devices.

The receiving means may be configured to receive a user selection of one or more of the remote devices by receiving a touch or swipe input on one or more display portions respectively associated with the one or more remote devices.

The receiving means may be configured to receive a user selection of one or more of the remote devices by receiving a swipe input substantially in the direction of the linked user device.

The linked user device may be a wearable device. For example, the wearable device may be a smartwatch. The apparatus may be a smartphone or tablet computer, for example.

According to a second aspect, this specification describes a method, comprising: communicating, by an apparatus, with a plurality of remote devices in a conference session; outputting, on a display, a user interface comprising a plurality of display portions respectively associated with the plurality of remote devices; receiving user selection of one or more of the remote devices; and based on the received user selection: causing display of a display portion associated with the one or more selected remote devices on a linked user device which is linked to the apparatus, and enabling one or more communications actions for use with the one or more selected remote devices.

The conference session may be a videoconference session in which outputting comprises outputting on the display a user interface comprising a plurality of video feed display portions respectively associated with the plurality of remote devices, and the method comprises, based on the received user selection, causing display of a video feed display portion associated with the one or more selected remote devices on the linked user device.

The enabling operation may comprise enabling audio and/or video communications actions with the selected one or more remote devices over a private communications channel which is not a part of the conference session.

The enabling operation may establish the private communications channel responsive to the received user selection.

The method may comprise detecting a user input for initiating audio and/or video communications over the private communications channel, and, based on detecting the user input, causing capture and sending of audio and/video data over the private communications channel.

The method may comprise, based on detecting a user input for initiating audio communications over the private communications channel, to cause capture of audio data by one or more microphones of the linked user device for sending over the private communications channel and to disable sending of audio data as part of the conference session.

Based on detecting the user input for initiating audio communications over the private communications channel, the method may comprise pausing or disabling sending of video data as part of the conference session.

The method may further comprise determining a motion of the linked user device, and detecting a user input for initiating audio communications over the private communications channel based on the determined motion of the linked user device corresponding to a predetermined gesture.

The method may further comprise determining a position of the linked user device, and detecting a user input for initiating audio communications over the private communications channel based on the determined position of the linked user device corresponding to a predetermined position.

The method may comprise detecting a user input for initiating audio communications over the private communications channel based on the determined position of the linked user device being within a predetermined distance of a user's mouth.

Based on detecting a user input for initiating video communications over the private communications channel, the method may comprise causing capture of video data by one or more cameras of the linked user device for sending over the private communications channel.

The method may comprise causing capture of audio data by one or more microphones of the apparatus for sending over the private communications channel.

The method may comprise determining a position of the linked user device relative to the apparatus and to apply beamforming to audio data captured by a microphone array based on the determined relative position.

Responsive to receiving user selection of a plurality of remote devices, the method may comprise causing either a simultaneous or sequential display of display portions respectively associated with the plurality of selected remote devices on the linked user device. The method may cause a sequential display of display portions on the linked user device by means of, at a first time, causing display of a first display portion associated with a first one of the selected remote devices and subsequently, responsive to a user input received by the linked user device, causing display of a second display portion associated with a second one of the selected remote devices.

The method may enable the one or more conference actions only for the selected remote device which has its associated display portion displayed at a current time.

The method may output, on the user interface of the apparatus, one or more interactive user interface elements corresponding to one or more conference actions for the one or more selected remote devices.

Upon causing display of a display portion associated with the one or more selected remote devices on the linked user device, the method may remove the display portion associated with the respective one or more selected remote devices from the user interface of the apparatus.

The method may further comprise: receiving a user input for a complementary selection of remote devices; based on the received user input for a complementary selection: causing de-selection of one or more currently-selected remote devices such that their respective display portions are removed from the linked user device and the one or more enabled actions are disabled for said currently-selected remote devices; and causing selection of currently non-selected remote devices such that their respective display portions are displayed on the linked user device and one or more actions are enabled for said currently non-selected remote devices.

A user selection of one or more of the remote devices may comprise receiving a touch or swipe input on one or more display portions respectively associated with the one or more remote devices.

A user selection of one or more of the remote devices may comprise receiving a swipe input substantially in the direction of the linked user device.

The linked user device may be a wearable device. For example, the wearable device may be a smartwatch.

The method may be performed by an apparatus such as a user device, for example a smartphone or tablet computer.

According to a third aspect, this specification describes a computer program comprising instructions for causing an apparatus to perform at least the following: communicating with a plurality of remote devices in a conference session; outputting, on a display, a user interface comprising a plurality of display portions respectively associated with the plurality of remote devices; receiving user selection of one or more of the remote devices; and based on the received user selection: causing display of a display portion associated with the one or more selected remote devices on a linked user device which is linked to the apparatus, and enabling one or more communications actions for use with the one or more selected remote devices.

Example embodiments may also provide any feature of the second aspect.

According to a fourth aspect, this specification describes a computer-readable medium (such as a non-transitory computer-readable medium) comprising program instructions stored thereon for performing at least the following: communicating, by an apparatus, with a plurality of remote devices in a conference session; outputting, on a display, a user interface comprising a plurality of display portions respectively associated with the plurality of remote devices; receiving user selection of one or more of the remote devices; and based on the received user selection: causing display of a display portion associated with the one or more selected remote devices on a linked user device which is linked to the apparatus, and enabling one or more communications actions for use with the one or more selected remote devices.

According to a fifth aspect, this specification describes an apparatus comprising: at least one processor; and at least one memory including computer program code which, when executed by the at least one processor, causes the apparatus to: communicate with a plurality of remote devices in a conference session; output, on a display, a user interface comprising a plurality of display portions respectively associated with the plurality of remote devices; receiving user selection of one or more of the remote devices; and based on the received user selection: causing display of a display portion associated with the one or more selected remote devices on a linked user device which is linked to the apparatus, and enabling one or more communications actions for use with the one or more selected remote devices.

BRIEF DESCRIPTION OF DRAWINGS

Example embodiments will now be described, by way of non-limiting example, with reference to the accompanying drawings, in which:

FIG. 3 is a plan view of the first user device, showing a first user interface;

FIG. 4 is a plan view of the first user device, showing a second, alternative user interface;

FIG. 5 is a flow diagram indicating processing operations according to an example embodiment;

FIG. 11 is a plan view of the linked user device showing a user interface comprising first and second display portions according to an example embodiment;

FIGS. 12A and 12B are plan views of the linked user device respectively showing user interfaces comprising a first display portion and a second, subsequently displayed, display portion according to an example embodiment;

DETAILED DESCRIPTION

Figure 1:
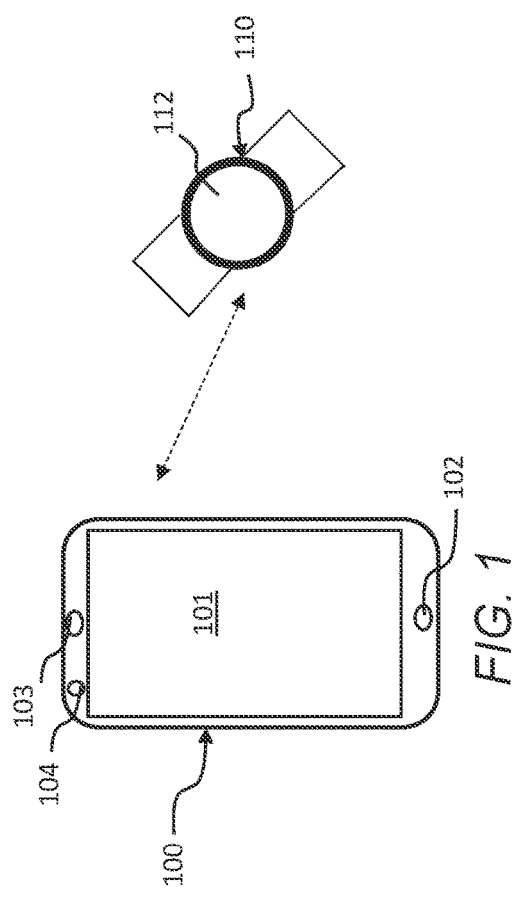
FIG. 1 is a plan view of a system comprising a first user device and a linked user device.

Example embodiments relate to apparatuses, methods and computer programs for enabling communications actions in, e.g. during, a conference session such as a videoconference session.

As described herein, a conference session may comprise one or more communications channels set-up between two or more devices over a communications network, and therefore between users or parties associated with the respective devices. A conference session may comprise, for example, one or more channels set up between two or more devices which are participants of the conference session, although their respective users may more commonly be referred to as the participants.

A device or user may be a host participant or an invited participant. The one or more communications channels may be established at the time of establishing the conference session to provide, typically, a multicast data feed from a given participant to each of the other participants in real-time or near real-time. The one or more communications channels may be bi-directional communications channels.

A device may comprise a user device, being a device operable by one or more users and configured to transmit and receive data over a communications network. The term "user device" will be used hereafter. The user device may comprise processing functionality for executing one or more applications, for example a conference application. The user device may also comprise one or more input modules and one or more output modules. For example, the user device may comprise one or more input transducers and one or more output transducers. For example, the one or more input transducers may comprise one or more microphones for converting sound waves to electrical signals which may be stored, processed and transmitted as audio data. For example, the one or more output transducers may comprise one or more loudspeakers for converting electrical signals into sound waves.

For example, the user device may also comprise one or more cameras for capturing video images which can be stored, processed and transmitted as video data. For example, the user device may comprise one or more displays, which may comprise any form of electronic display which may or may not be a touch-sensitive display. In the case of a touch-sensitive display, the display may also provide a form of input module, for example to receive and invoke selection commands based on detecting a touch input corresponding to a particular user interface element being displayed by the touch-sensitive display.

The user device may also comprise one or more other input modules, such as one or more of an accelerometer and gyroscope for generating motion data from which can be determined motion characteristics of the user device. The user device may also comprise one or more positioning receivers, such as a GNSS (Global Navigation Satellite System) receiver, for determining the geographic position of the user device.

A user device may comprise, but is not limited to, a smartphone, a digital assistant, a digital music player, a personal computer, a laptop, a tablet computer or a wearable device such as a smartwatch. The user device may be capable of establishing a communication session with one or more other user devices via a communications network, e.g. an audio or videoconference session. The user device may be configured to transmit and receive data using protocols for 3G, 4G, LTE, 5G or any future generation communication protocol. The user device may comprise means for short-range communications using, for example, Bluetooth, Zigbee or WiFi. The user device may comprise one or more antennas for communicating with external devices.

Referring to FIG. 1, an example first user device is shown in the form of a smartphone 100.

The smartphone 100 may comprise a touch-sensitive display (hereafter "display") 101, a microphone 102, a loudspeaker 103 and a front-facing camera 104. The smartphone 100 may additionally comprise a rear-facing camera (not shown) on a rear side of the smartphone. The front-facing camera 104 may be enabled during, for example, enablement of a videoconference application whereby video data captured by the front-facing camera may be transmitted over an established videoconference session.

Also shown in FIG. 1 is another user device 110 which is linked to the smartphone 100. Said other user device 110 is hereafter referred to as a "linked user device". In this context, the term "linked" means that the linked user device 110 comprises data communications functionality such that it may connect via, for example, one or more short-range communications channels to the first user device 100 using, for example, Bluetooth, Zigbee or WiFi as part of a local area network (LAN). In the context of Bluetooth, for example, the linked user device 110 may be "paired" with the first user device 100 in a conventional manner such that data may be transmitted between the first user device 100 and the linked user device 110, and vice versa. However, it will be appreciated that other methods of establishing short-range communications channels may enable data transmissions between the first user device 100 and the linked user device 110.

The linked user device 110 may comprise a wearable user device, such as a smartwatch or similar.

The term "linked" or "paired" in this context is not intended to imply that the linked user device 110 is the only device with which the first user device 100 can connect or link using short-range communications channels. Nor should the term "linked" or "paired" imply the necessity for a short-range communications channel for communications between the first user device 100 and the linked user device 110. For example, each of the first user device 100 and the linked user device 110 may communicate with a server which may forward data from one of the devices to the other and vice versa.

The linked user device 110 may alternatively comprise one or more of another smartphone, a digital assistant, a digital music player, a personal computer, a laptop, or a tablet computer, to give some examples.

The linked user device 110 may comprise a display 112 which may or may not be a touch-sensitive display. The linked user device 110 may also comprise one or more microphones and/or one or more loudspeakers (not shown). The linked user device 110 may also comprise one or more cameras (not shown).

Figure 2:
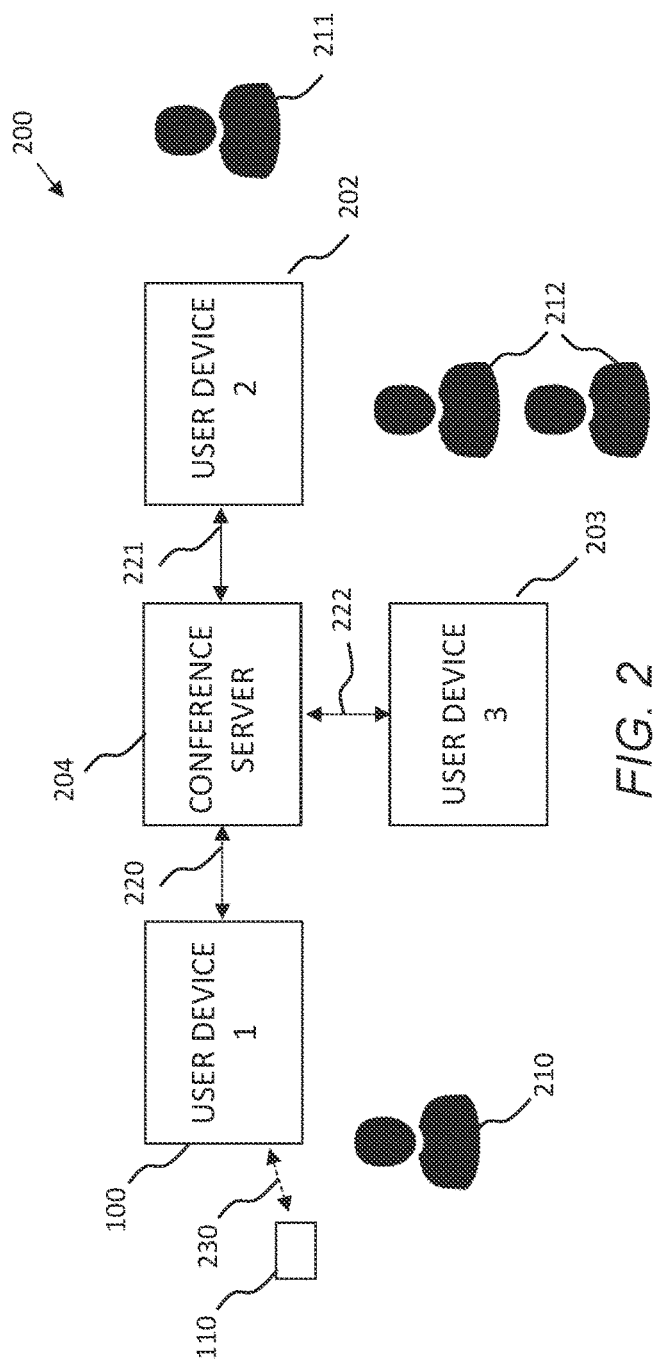
FIG. 2 is a block diagram of a videoconference system, including the FIG. 1 system, according to an example embodiment.

Referring to FIG. 2, a videoconference system 200 is shown. It should be appreciated that example embodiments are also applicable to audio-only, e.g. voice-only, conference systems although example embodiments relate to the shown videoconference system.

The videoconference system 200 may comprise a first user device 100 (here, the smartphone of FIG. 1 is assumed to be the first user device), a second user device 202, a third user device 203 and a conference server 204. The first user device 100 is shown connected to the linked user device 110 using an established short-range channel 230.

For the sake of illustration, the videoconference system 200 shown in FIG. 2 only comprises two remote devices, namely the second user device 202 and the third user device 203, but the videoconference system may comprise any number of user devices involved in a videoconference session.

A first user 210 may use the first user device 100, a second user 211 may use the second user device 202 and one (or more) third users 212 may use the third user device 203. The user devices 100, 202, 203 may, as is typical, be in different remote places.

The second and third user devices 203 may comprise any of, for example, a smartphone, a digital assistant, a digital music player, a personal computer, a laptop, a tablet computer or a wearable device such as a smartwatch. The second and third user devices 203 may comprise the same or similar functionality to the first user device 100, respectively comprising, for example, a display screen, one or more microphones, one or more loudspeakers and one or more front-facing cameras.

Each of the first, second and third user devices 100, 202, 203 may communicate streams of captured audio and video data with the other user devices via the conference server 204 as part of a conference session, in this example a videoconference session.

For example, the first user device 100 may communicate an audio stream and an accompanying video stream of the first user 210 talking, e.g. when the first user is facing the front-facing camera 104. The audio and video streams may be transmitted over a first channel 220 established between the first user device 100 and the conference server 204. The audio and video streams may then be transmitted by the conference server 204 to the second and third user devices 202, 203 over respective second and third channels 221, 222 using, or in the manner of, a multi-cast transmission protocol established between the conference server and the second and third user devices. Although the first, second and third channels 220, 221, 222 are represented by single lines, indicative of bidirectional channels, there may be separate channels, one for transmission and one for reception. The same principles of operation apply to the second and third user devices 202, 203 when communicating audio and video streams as part of a videoconference session.

The conference server 204 may be configured to establish a conference session upon receipt of a request from one of the first, second or third user devices 100, 202, 203. The request may identify the first user device 100 as a host device or participant and the second and third user devices 202, 203 as invited user device(s) or participants. The conference server 204 may thereafter forward a signal to the second and third user devices 202, 203, inviting them to join the conference session. Upon acceptance by, for example, the second user device 202, the second channel 221 may be established. The same process may apply to the third user device 203 for establishing the third channel 222. One or more further user devices (not shown) may subsequently be invited to join the conference session.

The audio and video streams may comprise audio packets and associated video packets. The audio packets and the video packets may comply with any suitable conference standard, such as the Real Time Protocol (RTP). The audio packets and the video packets may, for example, comprise a packet header comprising control information and a packet body comprising the audio or video data content. The packet header may, for example, comprise a sequence number, which indicates the sequential position of a packet in a stream of transmitted packets. The packet header may also comprise a timestamp which indicates the timing of transmitting the packet. The packet body may comprise encoded audio or video data which was captured during a time slot before transmitting the packet. For example, video data of a packet may comprise a sequence of images representing encoded pixels and spatial coordinates.

Each of the first, second and third user devices 100, 202, 203 may comprise an apparatus such as that shown and described below with reference to FIG. 13. Each of the first, second and third user devices 100, 202, 203 may be configured by means of hardware, software, firmware or a combination thereof to perform operations described below, for example with reference to FIG. 5.

For ease of explanation, example embodiments will be described in relation to the first user device 100 which may be configured to perform operations based on execution of a conference application, e.g. a videoconference application.

The videoconference application, when executed by the first user device 100, may be used by to establish a videoconference session via the conference server 204, e.g. at a current time or at a future time, and to identify a list of participants for the videoconference session including the second and third user devices 202, 203. The videoconference application may also be used by the first user device 100 to join an existing videoconference session. The videoconference application may be stored on the first user device 100 or may comprise an applet or plug-in that is temporarily executed by the first user device upon connection to the conference server 204 via a web browser interface.

The videoconference application, when executed, may provide a user interface on a display of the first, second and third user devices 100, 202, 203 during a videoconference session.

For example, with reference to FIG. 3, an example user interface 300 is shown on the display 101 of the first user device 100.

The user interface 300 may comprise a plurality of display portions 301, 302, 303. A first display portion 301 may show a video feed of the first user 210 i.e. video data captured by the front-facing camera 104. In some example embodiments, the first display portion 301 may not be shown or may be disabled or removed by the first user 210. A second display portion 302 may show a video feed of the second user 211 and a third display portion 303 may show a video feed of the one or more third users 212. Audio data received from microphones of the second and third user devices 202, 203 may be output via the loudspeaker 103 of the first user device 100.

The user interface 300 may also comprise one or more interactive user interface elements (hereafter "UI elements") 305, 306 corresponding to one or more conference actions.

For example, a first UI element 305 may correspond to a muting action, whereby selection of the first UI element causes the application to disable the microphone of the first user device 100 and/or prevents sending of audio data from the first user device to the second and third user devices 202, 203 as part of the conference session. Re-selection of first UI element 305 may undo the muting action. For example, a second UI element 306 may correspond to a hang-up or leave action, whereby selection of the second UI element may cause the first user device 100 to leave the conference session.

FIG. 4 is another example user interface 400 which is similar to the FIG. 3 user interface save for the spatial arrangement of first, second and third display portions 401, 402, 403 (which may correspond to the first, second and third display portions 301, 302, 303 shown in FIG. 3.) For example, a background of the user interface 400 may comprise a map (not shown), and the spatial arrangement of the first, second and third display portions 401, 402, 403 may indicate in relation to the map where the respective first, second and third user devices 100, 202, 203 are located.

FIG. 5 is a flow diagram indicating processing operations that may be performed by the first user device 100 according to one or more example embodiments. As mentioned above, the processing operations may be performed by means of hardware, software, firmware or a combination thereof.

A first operation 500 may comprise communicating with a plurality of remote devices in a conference session.

A second operation 501 may comprise outputting, on a display, a user interface comprising a plurality of display portions respectively associated with the plurality of remote devices.

A third operation 502 may comprise receiving user selection of one or more of the remote devices.

A fourth operation 503 may comprise causing display of a display portion associated with the one or more selected remote devices on a linked user device which is linked to the apparatus.

A fifth operation 504 may comprise enabling one or more communications actions for use with the one or more selected remote devices.

The fourth and fifth operations 503, 504 may be performed in any order or simultaneously.

In the case that the conference session is an audio-only conference session, each of the plurality of display portions may comprise some representation of the respective remote devices or their associated user(s). For example, each of the display portions may comprise a photograph, an icon or one or more initials associated with the respective remote devices or their associated user(s).

Where the conference session is a videoconference session, the display portions may comprise video feeds from the respective remote devices, e.g. a plurality of video feeds respectively associated with the plurality of remote devices.

In this way, the first user device 100 may operate in what may be termed a "dual device mode" in which, for example, a subset of the second and third user devices 202, 203 currently connected to a conference session can be selected to enable one or more communications actions that may be specific to those selected device(s). Also, selection may cause their respective video feed(s) to be displayed by the linked user device 110 to indicate which of the user devices are enabled for the one or more communications actions. This may also serve to free-up user interface space, which may become cluttered as more user devices participate in a videoconference session.

In terms of enabling or more communications actions for use with the one or more selected remote devices, this may comprise enabling audio and/or video communications with the selected one or more remote user devices over a private communications channel which is not part of the conference session.

The term "private communications channel" may refer to a channel which is established so that audio and/or video communications over the private communications channel are not sent to the non-selected user device(s) as part of the conference session.

Additionally, or alternatively, one or more UI elements may be enabled. The one or more UI elements may correspond to one or more other communications actions for the one or more selected remote devices, as distinct from those for the non-selected user device(s). The other communications actions may comprise, for example, a muting action and/or a hang-up or leave action.

Example embodiments will now be described in more detail with reference to FIGS. 6-12.

Figure 6:
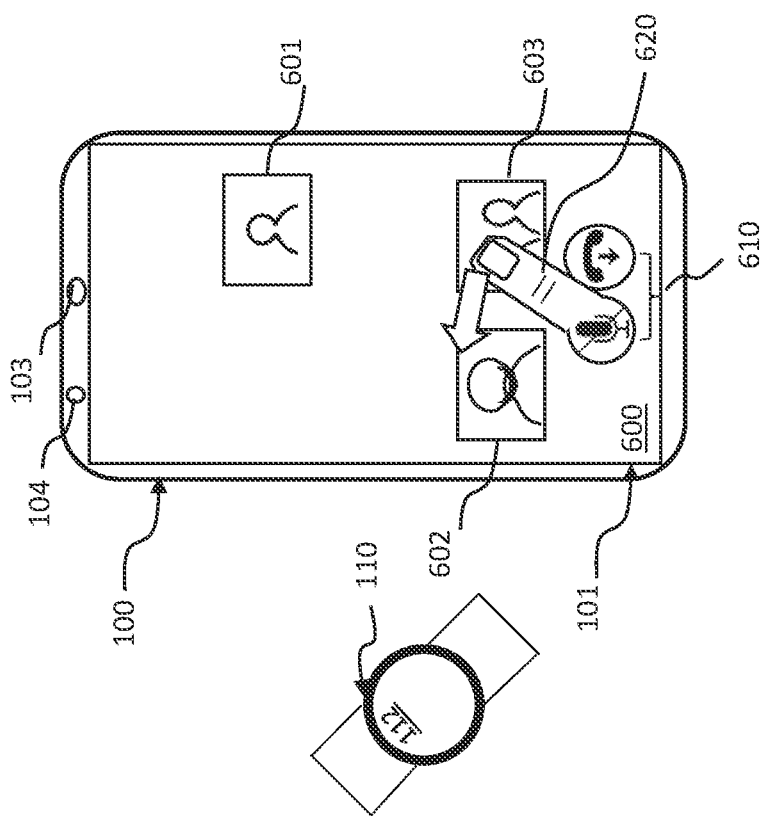
FIG. 6 is a plan view of the first user device and the linked user device, indicative of the first user device having receiving a user input according to an example embodiment.

FIG. 6 shows the first user device 100 and the linked user device 110 as previously described with reference to FIG. 1. The first user device 100 may be joined to a videoconference session with the second and third user devices 202, 203 using the videoconference system 200 shown in FIG. 2.

The first user device 100 may display a user interface 600 similar to that shown in FIG. 4. The user interface 600 may comprise a plurality of display portions 601, 602, 603. Optionally, a first display portion 601 may show a video feed of the first user 210 i.e. video data captured by the front-facing camera 104. A second display portion 602 may show a video feed of the second user 211 and a third display portion 603 may show a video feed of the one or more third users 212.

Audio data received from microphones of the second and third user devices 202, 203 may be output via the loudspeaker 103, or a connected earphones device, or similar, connected to the first user device 100.

The user interface 600 may also comprise one or more UI elements 610 corresponding to one or more conference actions for the conference session, for example the muting and hang-up/leave actions described above with reference to FIGS. 3 and 4.

Selection of one of the second and third user devices 202, 203 may be received via the user interface 600.

For example, user selection of the third user device 203 may be received by means of a touch input, e.g. via a user's finger 620, corresponding with the third display portion 603. Alternatively, user selection may be received by means of a swipe input or any other predetermined gesture which corresponds with selecting a remote device for the purposes described herein.

For example, selection of the third user device 203 may be received by means of a swipe input substantially in the direction of the linked user device 110.

Alternatively, or additionally, selection of the third user device 203 may be received by means other than a touch input. For example, selection of the third user device 203 may be by means of a voice command received by the first user device 100, e.g. via the microphone 102 shown in FIG. 1. For example, selection of the third user device 203 may be by means of detecting that the linked user device 110 is positioned proximate to the third display portion 603 on the user interface 600.

It will be appreciated that the above-described methods for selecting the third user device 203 are applicable also for selecting the second user device 202 and indeed any other user device that may join the videoconference session.

Figure 7:
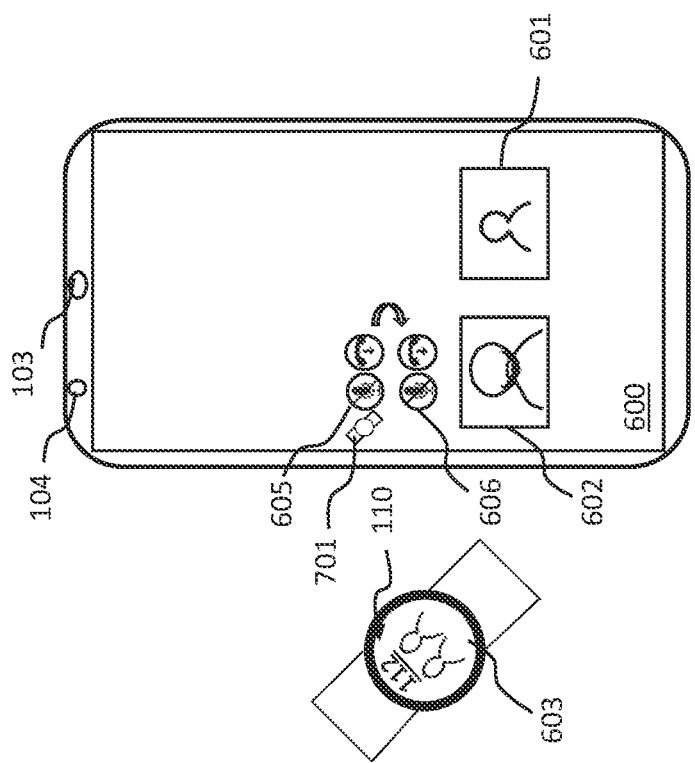
FIG. 7 is a plan view of the first user device and the linked user device, indicative of a result of receiving a user input according to an example embodiment.

Referring to FIG. 7, it is seen that selection of the third user device 203 is effective to cause the third display portion 603 to be displayed on the display 112 of the linked user device 110.

The third display portion 603, when displayed on the display 112 of the linked user device 110, may be identical to that displayed on the user interface 600 of the first user device 100. However, in some example embodiments, the third display portion 603 may be modified for display on the display 112 of the linked user device 110, for example to reduce or enlarge its size.

In some example embodiments, the third display portion 603 may also be removed from the user interface 600 of the first user device 100 to free-up space. Although not shown in FIG. 7, the remaining first and second display portions 601, 602 may automatically enlarge in response to removal of the third display portion 603.

In response to selection of the third user device 203, the first user device 100 may be configured to enable audio and/or video communications with the selected third user device over a private communications channel which is not part of the conference session. This means that audio and/or video data communicated over the private communications channel will not be received by the second user device 202.

The private communications channel may be established automatically responsive to the received selection of the third user device 203. Alternatively, further user input may be required to establish the private communications channel and/or to initiate communications over the private communications channel.

In response to selection of the third user device 203, the videoconference application may also enable one or more UI elements 605 for display on the user interface 600 of the first user device 100. The one or more interactive UI elements 605 may correspond to one or more other communications actions such as, for example, a muting action and/or a hang-up or leave action.

The one or more interactive user interface elements 605, when selected, may be applicable only to communications with the third user device 203 over the private communications channel. For example, selection of a muting action via one of the UI elements 605 may mute audio data transmitted over the private communications channel. For example, selection of a hang-up or leave action via one of the UI elements 605 may end or terminate the private communications channel.

The one or more UI elements 605 may be distinguished from the other UI elements 606 associated with the videoconference session by means of, for example, a graphical indicator 701. The one or more UI elements 605 may be displayed on the user interface 600 of the first user device 100 instead of on the display 112 of the linked user device 110 in order to take advantage of what is, generally, a larger display area meaning that the UI elements can be larger in size and therefore incorrect selections are avoided.

Figure 8:
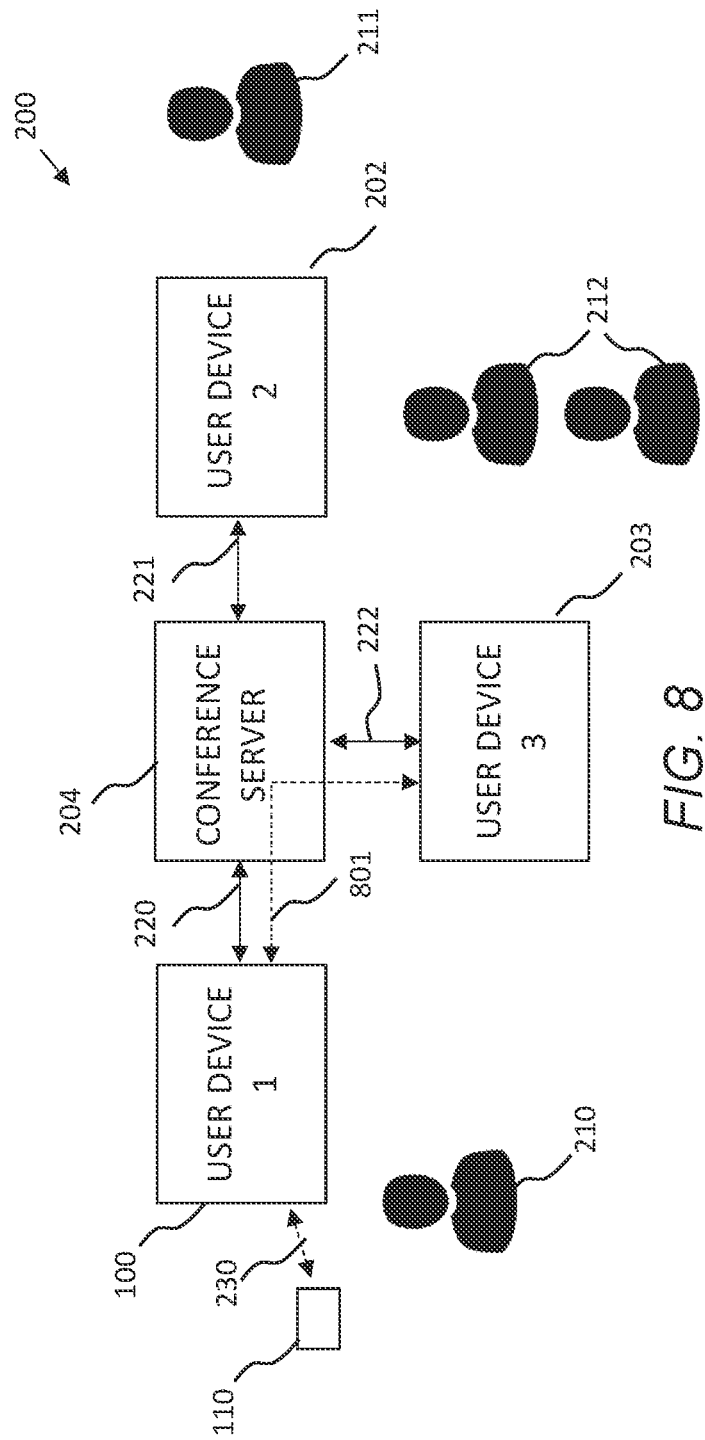
FIG. 8 is a block diagram of the FIG. 2 videoconference system, including a private communications channel, according to an example embodiment.

FIG. 8 is a block diagram indicating the videoconference system 200 of FIG. 2 after a private communications channel 801 is established between the first user device 100 and the third user device 203.

The private communications channel 801 may be set-up via the conference server 204, and may effectively comprise two channels with the conference server receiving data over a first channel and relaying the data over the second channel. Logically, however, they may be considered as one private communications channel 801. Alternatively, the private communications channel 801 may be set up directly between the first user device 100 and the third user device 203, for example via some other communications network.

At a time when the private communications channel 801 is enabled, the first user device 100 may be configured to detect a user input for initiating audio and/or video communications over the private communications channel. Based on detecting the user input, the first user device 100 may be configured to cause capture and sending of the audio and/or video data over the private communications channel 801.

Different user inputs may be respectively associated with initiating only audio, only video, and audio and video communications over the private communications channel 801.

For example, based on detecting a first user input for initiating only audio communications over the private communications channel 801, the first user device 100 may be configured to cause capture of audio data by one or more microphones of the linked user device 110 for sending over the private communications channel.

The first user device 100 may also be configured to disable sending of the audio data as part of the conference session such that the captured audio data is not heard at the second user device 202. The first user device 100 may also be configured to pause or disable sending of video data captured by, for example, the front-facing camera 104 of the first user device as part of the conference session. In this way, the second user 211 cannot see that the first user 210 is engaged in a private conversation with the one or more third users 212 nor lip-read part of the private conversation.

The first user input may be received via, for example, the user interface 600 of the first user device 100.

Alternatively, or additionally, the first user input may be received based on an action at the linked user device, such as a detected motion of the linked user device 110. The linked user device 110 may comprise one or more sensors, such as one or more of an accelerometer and gyroscope, for generating motion data which is receivable by the first user device 100 using the established short-range channel 230. The first user device 100 may be configured to detect, from the received motion data, a determined motion of the linked user device 110 that corresponds to a predetermined gesture associated with the first user input. Alternatively, or additionally, a motion sensor of the first user device 100 may be configured to detect the determined motion of the linked user device 110.

Alternatively, or additionally, the first user device 100 may be configured to determine a position of the linked user device 110 and to detect that the determined position corresponds to a predetermined position associated with the first user input. The position of the linked user device 110 may be determined using any known method. For example, if the linked user device 110 comprises a positioning receiver, positioning data generated by the linked user device may be transmitted to the first user device 100 using the established short-range channel 230.

Alternatively, or additionally, if a distance between the linked user device 110 and the first user device 100 can be computed, positioning data generated by a positioning receiver of the first user device 100 can be modified using the computed distance to estimate the position of the linked user device. The distance between the linked user device 110 and the first user device 100 may be computed based on, for example, received signal strength indication (RSSI) signals or data.

In some example embodiments, the first user device 100 may be configured to detect that the linked user device 110 is within a predetermined distance $d_1$ of a user's mouth, i.e. that of the first user 210. The predetermined distance may be in the order of 0-20 centimetres but may be varied using, for example, settings associated with the videoconference application. Detection may be based on one or a combination of the above-mentioned motion data and position data. Alternatively, or additionally, the first user device 100 may be configured to detect that the linked user device 110 is within the predetermined distance $d_1$ of the user's mouth based on the amplitude of audio signals received from the linked user device 110 being above a predetermined threshold.

Where the first user device 100 is configured to pause or disable sending of video data, this may occur prior to the linked user device 110 being within the predetermined distance $d_1$ of the user's mouth, for example by detecting a certain acceleration and/or direction of motion of the linked user device towards the user's mouth. This may avoid the second user 211 noticing that the communications channel 801 is about to be used.

Figure 9:
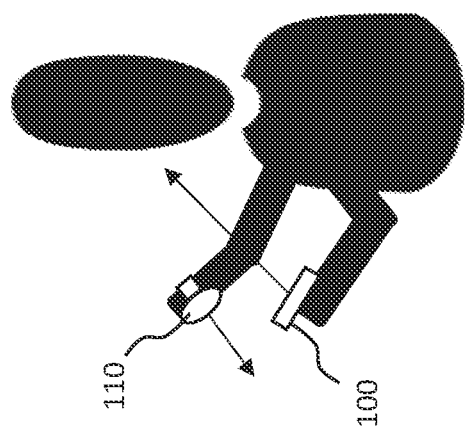
FIG. 9 is a perspective view of a first user using the first user device and linked user device according to an example embodiment.

FIG. 9 shows the above-described situation whereby the first user 210 moves the linked user device 110 to a position within a predetermined distance $d_1$ of their mouth for initiating audio communications over the private communications channel 801. The first user 210 may continue to view video data associated with the ongoing conference session on the display 101 of the first user device 100.

Alternatively, or additionally, based on detecting a second user input for initiating video communications over the private communications channel 801, the videoconference application may be configured to cause capture of video data by one or more cameras of the linked user device 110 for sending over the private communications channel.

The second user input may be received via, for example, the user interface 600 of the first user device 100. Alternatively, the second user input may be received based on any of the above-described motion and/or position based detection methods, provided it can be distinguished from the first user input.

Figure 10:
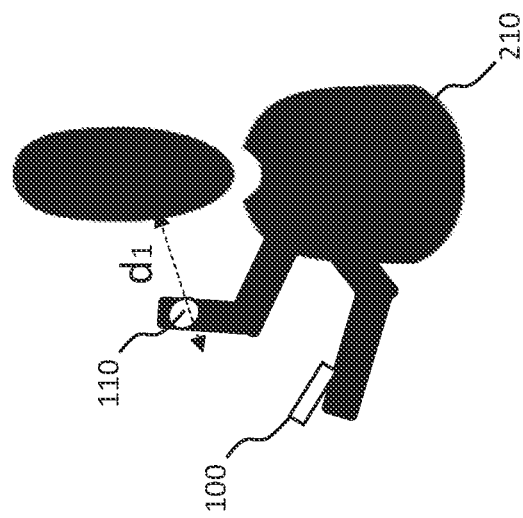
FIG. 10 is a perspective view of the first user using the first user device and linked user device according to another example embodiment.

FIG. 10 shows the above-described situation whereby the first user 210 provides a second user input for initiating video communications and may direct a camera of the linked user device 110 towards some object 1000 that the first user wishes to show to the one or more third users 212 over the private communications channel 801. The first user 210 may continue to view the ongoing conference session on the display 101 of the first user device 100. The front-facing camera 104 of the first user device 100 may continue to provide video data as part of the videoconference session.

The first user device 100 may be further configured to cause capture of audio data by one or more microphones of the first user device (and/or the linked user device 110) for sending over the private communications channel 801.

For example, the first user device 100 may comprise an array of microphones, and the first user device may be configured to determine a position of the linked user device 110, relative to the first user device, and to apply beamforming to the microphone array based on the determined relative position. In this way, the audio data which is communicated over the private communications channel 801 may comprise a directional component based on where the linked user device 110 is positioned relative to the first user device.

In some example embodiments, there may be received by the videoconference application selection of a plurality of remote devices.

For example, referring back to FIG. 4, assuming there were further remote devices in the conference session and therefore further display portions displayed on the user interface 400, the first user 210 may select, in addition to the third user device 203, the second user device 202. The first user device 100 may be configured, responsive to selection of the second and third remote user devices 202, 203, to cause either a simultaneous or sequential display of the second and third display portions 602, 603 on the linked user device 110, respectively associated with the second and third remote devices. FIG. 11 shows a simultaneous display of the second and third display portions 602, 603 on the linked user device 110.

If the first user device 100 is configured to cause a sequential display of the second and third display portions 602, 603, this may be performed by means of causing display, at a first time, of one of the second and third display portions, and subsequently, responsive to a user input received by the linked user device 110, to cause display of the other of the second and third display portions. FIGS. 12A and 12B show this sequential display wherein the third display portion 603 is first displayed (FIG. 12A), and then the second display portion 602 is displayed (FIG. 12B).

The user input received by the linked user device 110 may comprise, for example, a touch input on its display 112, if touch sensitive, or a rotation of a bezel 1200, or any other suitable means of input.

In some example embodiments, the videoconference application may be configured to enable the one or more communication actions only for the selected user device which has its associated display portion displayed at a current time.

For example, with reference to FIG. 12A, the one or more communication actions such as communicating over said private communications channel 801 and/or enabling the muting or hang-up/leave actions may only be used with the third user device 203.

In some example embodiments, the first user device 100 may also be configured to receive a user input for a complementary, or switching selection of remote devices and, based on the received user input for a complementary selection, to cause (i) de-selection of one or more currently-selected remote devices such that their respective display portions are removed from the linked user device and the one or more enabled actions are disabled for said currently-selected remote devices, and (ii) to cause selection of currently non-selected remote devices such that their respective display portions are displayed on the linked user device and one or more actions are enabled for said currently non-selected remote devices.

With reference to FIG. 7, for example, responsive to receiving a complementary selection, the third user device 203 may be de-selected and the second user device 202 may be selected and their respective display portions 603, 602 swapped between the user interface 601 and the display 112 of the linked user device 110. This may enable the first user 210 to toggle between different private conversations in a quick and seamless way.

Other communications actions that may be enabled for the selected subset of remote devices may include enabling recording of audio and/or video data communicated over the private communications channel 801.

Example embodiments may enable a participant to a conference session, e.g. a videoconference, to select a subset of other participants to the conference session which may cause their respective display portions to be moved to a different, linked user device. This may free-up user interface space on the particular user device and may also enable one or more communications actions such as enabling or establishing a private communications channel such that user of the particular user device may converse or show information to one or more selected participants outside of the conference session. This may be in order to keep information secret and/or to avoid distracting the other, non-selected participants with irrelevant information. By showing display portions corresponding to the selected participant(s) on the linked user device, there is a clear separation between the participants. The selected participant(s) on the linked user device 110 may also be clearly visible compared with a potentially, much smaller display portion, if shown on the first user device 100 with a relatively large number of other participants.

Example Apparatus

Figure 13:
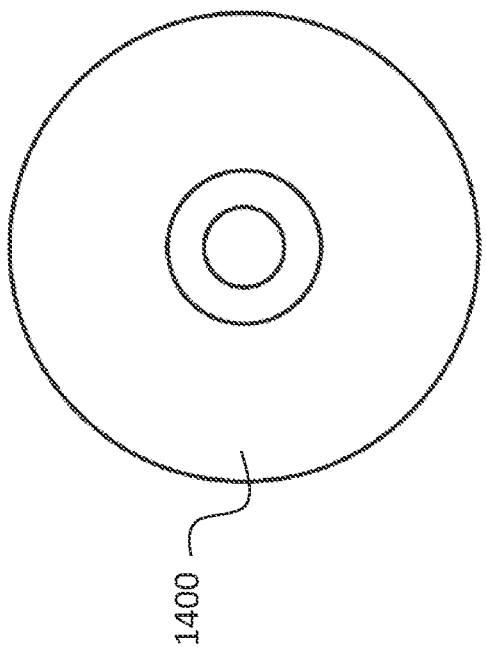
FIG. 13 is an apparatus that may be configured to perform one or more processing operations according to one or more example embodiments.

FIG. 13 shows an apparatus according to an embodiment, which may comprise the first user device 100, the linked user device 110, and/or the second and third user devices 202, 203, or components thereof. The apparatus may be configured to perform the operations described herein, for example operations described with reference to any preceding process, including that of FIG. 5. The apparatus comprises at least one processor 1300 and at least one memory 1301 directly or closely connected to the processor. The memory 1301 includes at least one random access memory (RAM) 1301a and at least one read-only memory (ROM) 1301b. Computer program code (software) 1305 is stored in the ROM 1301b. The apparatus may be connected to a transmitter (TX) and a receiver (RX). The apparatus may, optionally, be connected with a user interface (UI) for instructing the apparatus and/or for outputting data. The at least one processor 1300, with the at least one memory 1301 and the computer program code 1305 are arranged to cause the apparatus to at least perform at least the method according to any preceding process, including that of FIG. 5.

Figure 14:
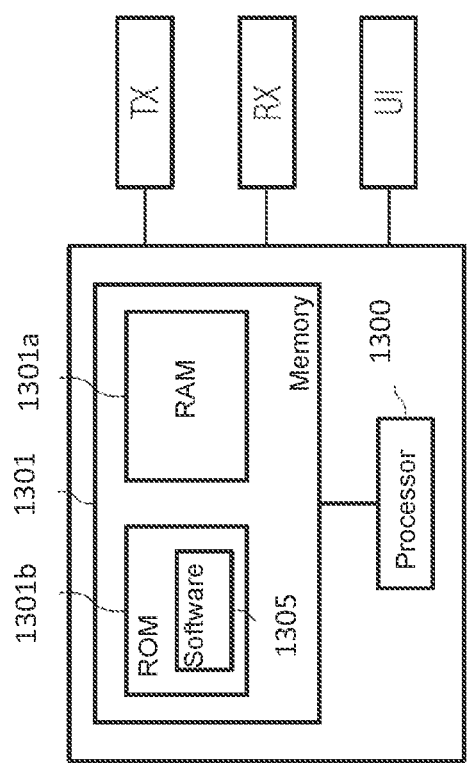
FIG. 14 is a non-transitory medium that may store computer program code for causing the FIG. 13 apparatus to perform one or more processing operations according to one or more example embodiments.

FIG. 14 shows a non-transitory media 1400 according to some embodiments. The non-transitory media 1400 is a computer readable storage medium. It may be e.g. a CD, a DVD, a USB stick, a blue ray disk, etc. The non-transitory media 1400 stores computer program code, causing an apparatus to perform the method of any preceding process, including that of FIG. 5.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
   at least one processor; and
   at least one non-transitory memory storing instructions that, when executed by the at least one processor, cause the apparatus to perform at least the following:
   communicate with a plurality of remote devices in a conference session;
   output, on a display, a user interface comprising a plurality of display portions respectively associated with the plurality of the remote devices;
   receive a user selection of one or more of the remote devices; and
   based on the received user selection:
   cause, in response to a selection of one or more of the display portions respectively associated with the selected one or more of the remote devices, a display of a display portion associated with the one or more selected remote devices, with which the apparatus communicates in the conference session, on a linked user device which is linked to the apparatus, and enable one or more communications actions for use with the one or more selected remote devices.

2. The apparatus of claim 1, wherein the conference session is a videoconference session in which the user interface comprises a plurality of video feed display portions respectively associated with the plurality of the remote devices, and wherein, based on the received user selection, the apparatus is configured to cause display of a video feed display portion associated with the one or more selected remote devices on the linked user device.

3. The apparatus of claim 2, wherein the enabling one or more communications actions further comprises enable audio and/or video communications actions with the selected one or more remote devices over a private communications channel which is not a part of the conference session.

4. The apparatus of claim 3, wherein the enabling one or more communications actions is further configured to establish the private communications channel responsive to the received user selection.

5. The apparatus of claim 3, further configured to cause to detect a user input for initiating at least one of audio or video communications over the private communications channel, and, based on the detected user input, cause capture and sending at least one of audio or video data over the private communications channel.

6. The apparatus of claim 5, further configured to cause to, based on the detected user input for initiating audio communications over the private communications channel, cause a capture of audio data by one or more microphones of the linked user device for sending over the private communications channel and to disable a sending of audio data as part of the conference session.

7. The apparatus of claim 6, wherein, based on the detected user input for initiating the audio communications over the private communications channel, the apparatus is further configured to cause to pause or disable sending of video data from the apparatus as part of the conference session.

8. The apparatus of claim 6, further configured to cause to determine a motion of the linked user device and detect a user input for initiating audio communications over the private communications channel based on the determined motion of the linked user device corresponding to a predetermined gesture.

9. The apparatus of claim 5, further configured to cause to determine a position of the linked user device and detect a user input for initiating audio communications over the private communications channel based on the determined position of the linked user device corresponding to a predetermined position.

10. The apparatus of claim 9, further configured to cause to detect a user input for initiating audio communications over the private communications channel based on the determined position of the linked user device being within a predetermined distance of a user's mouth.

11. The apparatus of claim 5, wherein, based on the detected user input for initiating the video communications over the private communications channel, the apparatus is further configured to cause to capture of video data by one or more cameras of the linked user device for sending over the private communications channel.

12. The apparatus of claim 11, wherein the apparatus is further configured to cause to capture of audio data by one or more microphones of the apparatus for sending over the private communications channel.

13. The apparatus of claim 12, wherein the apparatus comprises an array of microphones, wherein the apparatus is configured to determine a position of the linked user device relative to the apparatus and to apply beamforming to the audio data captured by the microphone array based on the determined relative position.

14. The apparatus of claim 1, wherein, responsive to the receiving of the user selection of the plurality of the remote devices, the apparatus is further configured to cause to:
cause either a simultaneous or sequential display of the display portions respectively associated with the plurality of the selected remote devices on the linked user device.

15. A method, comprising:
communicating, using an apparatus, with a plurality of remote devices in a conference session;
outputting, on a display, a user interface comprising a plurality of display portions respectively associated with the plurality of the remote devices;
receiving a user selection of one or more of the remote devices; and
based on the received user selection:
causing, in response to a selection of one or more of the display portions respectively associated with the selected one or more of the remote devices, a display of a display portion associated with the one or more selected remote devices, with which the apparatus communicates in the conference session, on a linked user device which is linked to the apparatus, and
enabling one or more communications actions for use with the one or more selected remote devices.

16. The method of claim 15, wherein the conference session is a videoconference session in which the user interface comprises a plurality of video feed display portions respectively associated with the plurality of the remote devices, and wherein, based on the received user selection, the method further comprises causing display of a video feed display portion associated with the one or more selected remote devices on the linked user device.

17. The method of claim 16, wherein the enabling one or more communications actions further comprising enabling audio and/or video communications actions with the selected one or more remote devices over a private communications channel which is not a part of the conference session.

18. The method of claim 17, wherein the enabling one or more communications actions is further configured to establish the private communications channel responsive to the received user selection.

19. The method of claim 17, further comprising detecting a user input for initiating at least one of audio or video communications over the private communications channel, and, based on detecting the user input, cause capture and sending at least one of audio or video data over the private communications channel.

20. A non-transitory computer readable medium comprising program instructions stored thereon for performing at least the following:
communicating, using an apparatus with a plurality of remote devices in a conference session;
outputting, on a display, a user interface comprising a plurality of display portions respectively associated with the plurality of the remote devices;
receiving a user selection of one or more of the remote devices; and
based on the received user selection:
causing, in response to a selection of one or more of the display portions respectively associated with the selected one or more of the remote devices, a display of a display portion associated with the one or more selected remote devices, with which the apparatus communicates in the conference session, on a linked user device which is linked to the apparatus, and
enabling one or more communications actions for use with the one or more selected remote devices.

* * * * *